(12) United States Patent
Chen

(10) Patent No.: US 7,221,123 B2
(45) Date of Patent: May 22, 2007

(54) BATTERY CONTAINER FOR AN ELECTRIC VEHICLE

(76) Inventor: Yung Cheng Chen, No. 7, Lane 398, Hung Chang 12th St., Chung Shan Li, Tao Yuan City (TW)

( * ) Notice: Subject to any disclaimer, the term of this patent is extended or adjusted under 35 U.S.C. 154(b) by 149 days.

(21) Appl. No.: 11/035,449

(22) Filed: Jan. 14, 2005

(65) Prior Publication Data

US 2006/0087279 A1    Apr. 27, 2006

(30) Foreign Application Priority Data

Oct. 26, 2004    (TW) .................................. 93216990

(51) Int. Cl.
*B60B 33/06*    (2006.01)

(52) U.S. Cl. .................... 320/104; 320/104; 320/110; 320/112; 320/113; 280/28.12; 280/642

(58) Field of Classification Search ................ 320/104, 320/107, 10, 112, 113, 114; 429/96, 97, 429/100; D13/103, 104, 109; 280/28.12, 280/642

See application file for complete search history.

(56) References Cited

U.S. PATENT DOCUMENTS

| 1,392,757 | A | * | 10/1921 | Gales ........................ 180/68.5 |
| 1,636,562 | A | * | 7/1927 | Hick ......................... 180/68.5 |
| 5,004,081 | A | * | 4/1991 | Custer ....................... 180/68.5 |
| 5,036,938 | A | * | 8/1991 | Blount et al. ............... 180/208 |
| 5,047,081 | A | * | 9/1991 | Tanabe et al. ................ 75/555 |
| 5,522,734 | A | * | 6/1996 | Goertzen .................... 439/500 |
| 6,275,003 | B1 | * | 8/2001 | Marukawa et al. .......... 320/116 |
| 6,508,322 | B2 | * | 1/2003 | Dignitti et al. ............. 180/68.5 |
| 6,586,132 | B1 | * | 7/2003 | Fukuda et al. .............. 429/120 |
| 6,699,616 | B2 | * | 3/2004 | Wu ............................. 429/98 |
| 6,955,511 | B1 | * | 10/2005 | Preta .......................... 410/107 |
| 2002/0122978 | A1 | * | 9/2002 | Setliff ........................ 429/178 |

* cited by examiner

*Primary Examiner*—Karl Easthom
(74) *Attorney, Agent, or Firm*—Egbert Law Offices

(57) ABSTRACT

A battery container of an electric vehicle is installed on the battery container supporting stand of the electric vehicle body. The container is a composite type and formed through alignment and combination of first and second cases. There are connecting ports, mutually embedded and mounted, on the assembled sides of these cases. The connecting ports have positive and negative electric connectors that can be oppositely inserted and jointed. The electrodes of the batteries inside the two cases can be connected. The battery container supporting stand forms a shape of a supporting surface. To ensure that the cases are placed together on the battery container supporting stand after alignment and combination, the assemblies of the positioning structure are used to control the positioning of and detachment between the battery container supporting stand and the cases. The battery container of an electric vehicle can be easily detached for independent charge.

2 Claims, 6 Drawing Sheets

BATTERY CONTAINER FOR AN ELECTRIC VEHICLE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to an electric vehicle, particularly to an electric vehicle having a battery container of a combined type and formed by the alignment and combination of two cases, which are then placed and fixed on the top of the electric vehicle's battery container supporting stand.

BACKGROUND OF THE INVENTION

It has been noted that the battery container of a conventional electric vehicle is usually contained and placed in the preset fixed slot on the vehicle body. To charge the battery, it is required to move the electric vehicle to the place closest to the location providing chargeable electrical power, and then through the connection by a charge cord, the task of power charge can be accomplished. However, due to different living environment, electric vehicle users might encounter such problem that their electric vehicles cannot be moved close to the electrical power supply spot (like upstairs or very narrow locations). This thus causes the waste of time and labor, and also the difficulties and inconveniences during the charging process. It is thus necessary to improve the design to overcome the problems.

In the light of these problems, the inventor, based on the experiences of designing and developing related products for many years, aimed at the above objective, and after detailed design and cautious evaluation, ultimately obtained an invention of real practicability.

BRIEF SUMMARY OF THE INVENTION

The facts of improving functionality and effectiveness by this invention follow.

The present invention provides an innovative structural and spatial shape design of an electric vehicle, with a type for a composite battery container that is formed by the alignment and combination of two cases placed and fixed on the top of the electric vehicle's battery container supporting stand. It is indeed the first seen design in the industry and meets the novelty requirements for new patents.

Through this specially improved structure design, the battery container of an electric vehicle can be easily detached from the vehicle for the charge of power, which makes the charge time-saving and convenient, as well as less limited by space constraints, and consequently more practical and easier to use.

As its structural features, the battery container is composed of two cases, which are aligned and combined together. It can be divided into two groups for independent charge, which greatly shortens the charging time and saves the labor to convey it.

New effects produced by this invention follow.

The structure design of the positioning structure, as composed of a fixed base 20, a positioning board 30 and a retractable spring 40, is simple and advantageous for mass production, and is quite practical and convenient in that the battery container can be released just by a simple pulling action.

The above is the detailed description of the technical characteristics of this invention based on the instance that is implemented well. However, experts familiar with this technique are allowed to change and modify this invention as long as they do not depart from the spirit and principle of this invention. Any change and modification may still be confined to the following scope defined by the present patent.

DETAILED DESCRIPTION OF THE INVENTION

Figure 1:
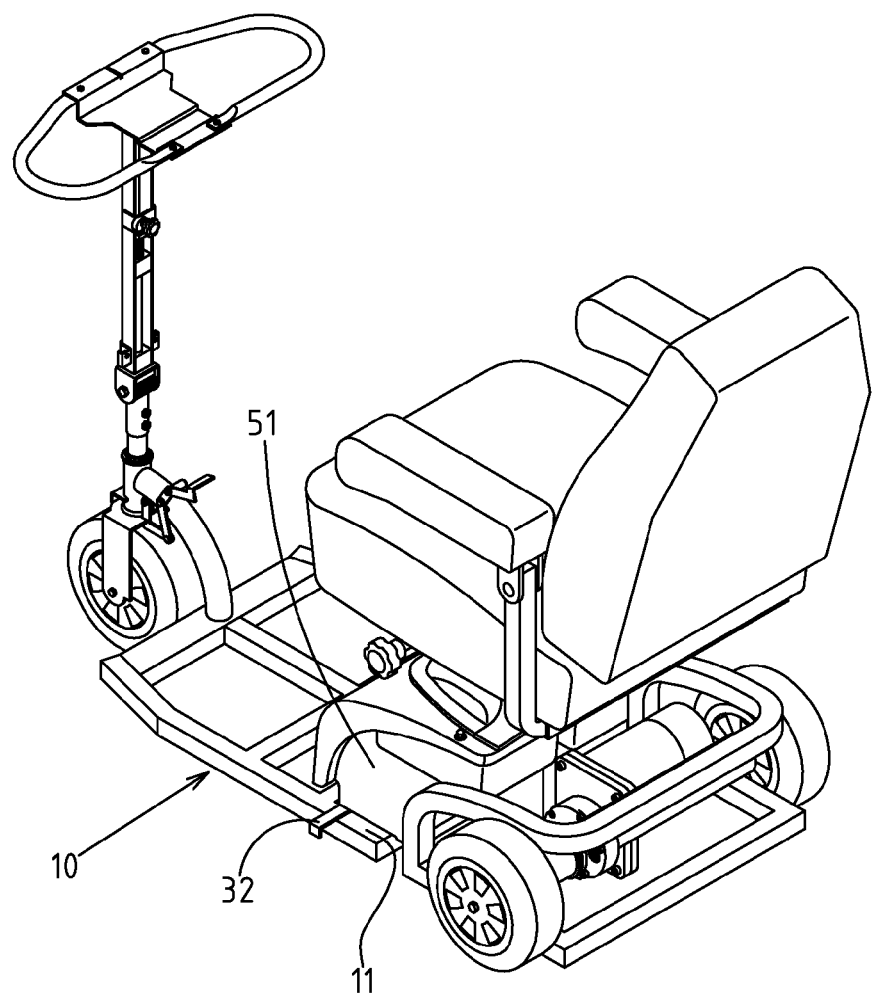
FIG. 1 shows a perspective view of the embodiment of the electric vehicle.
Figure 2:
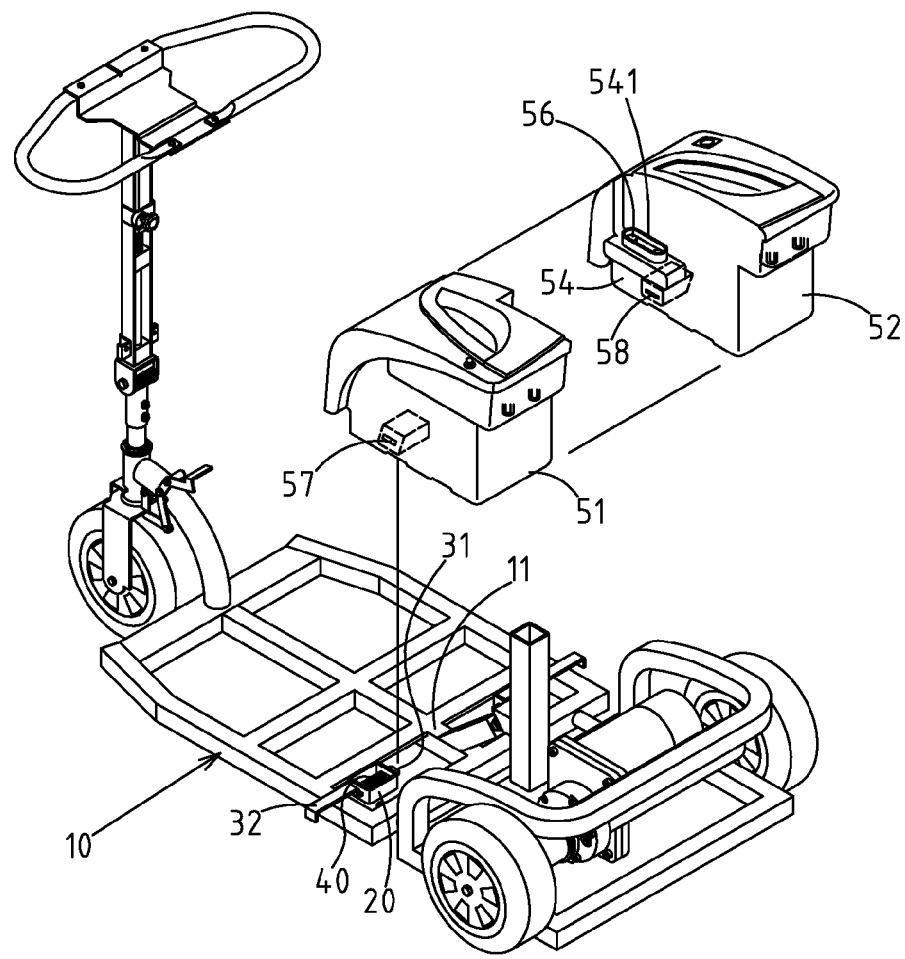
FIG. 2 shows an exploded perspective view of the battery container.
Figure 3:
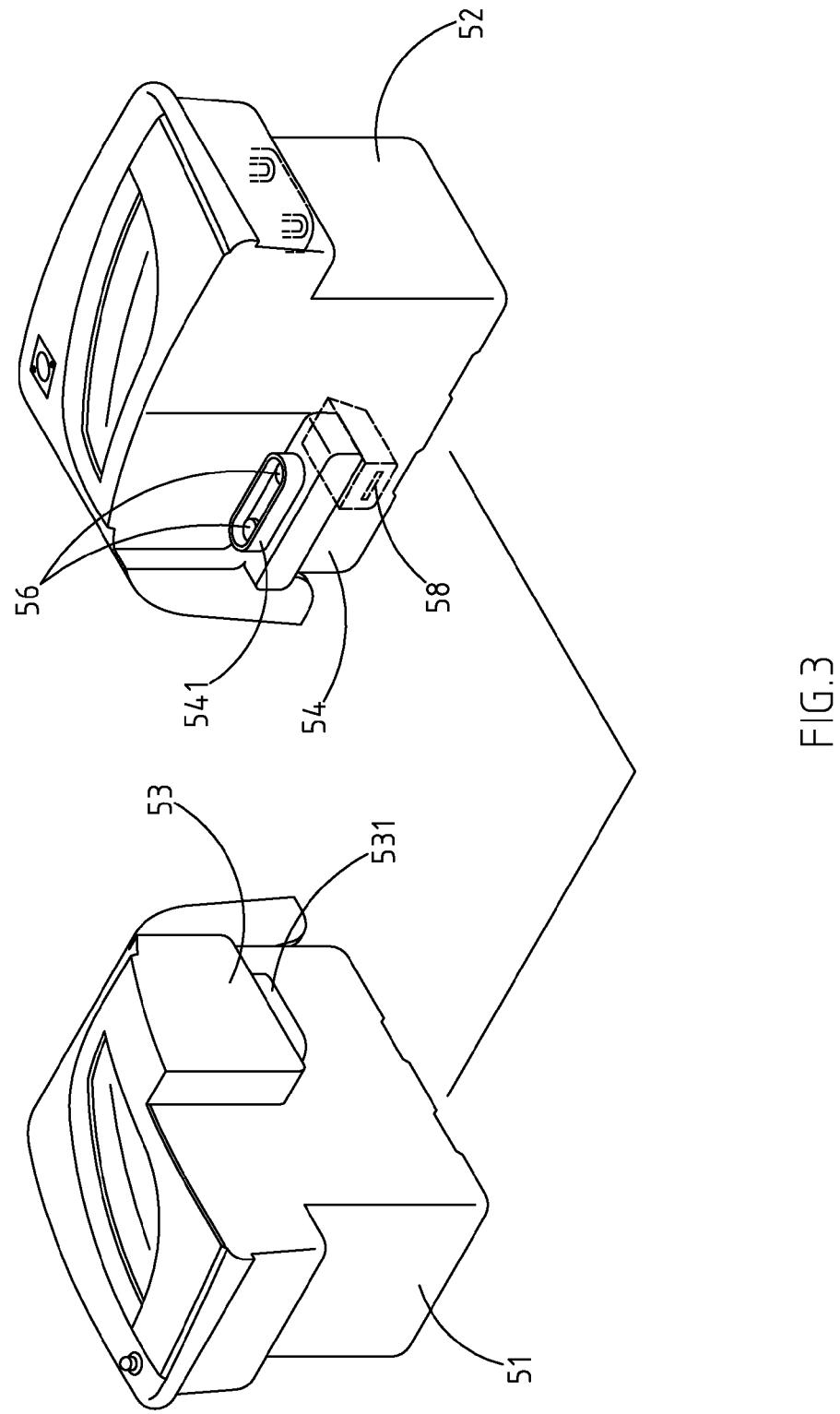
FIG. 3 shows another exploded perspective view of the battery container, more specifically the internal structures of the battery container.
Figure 4:
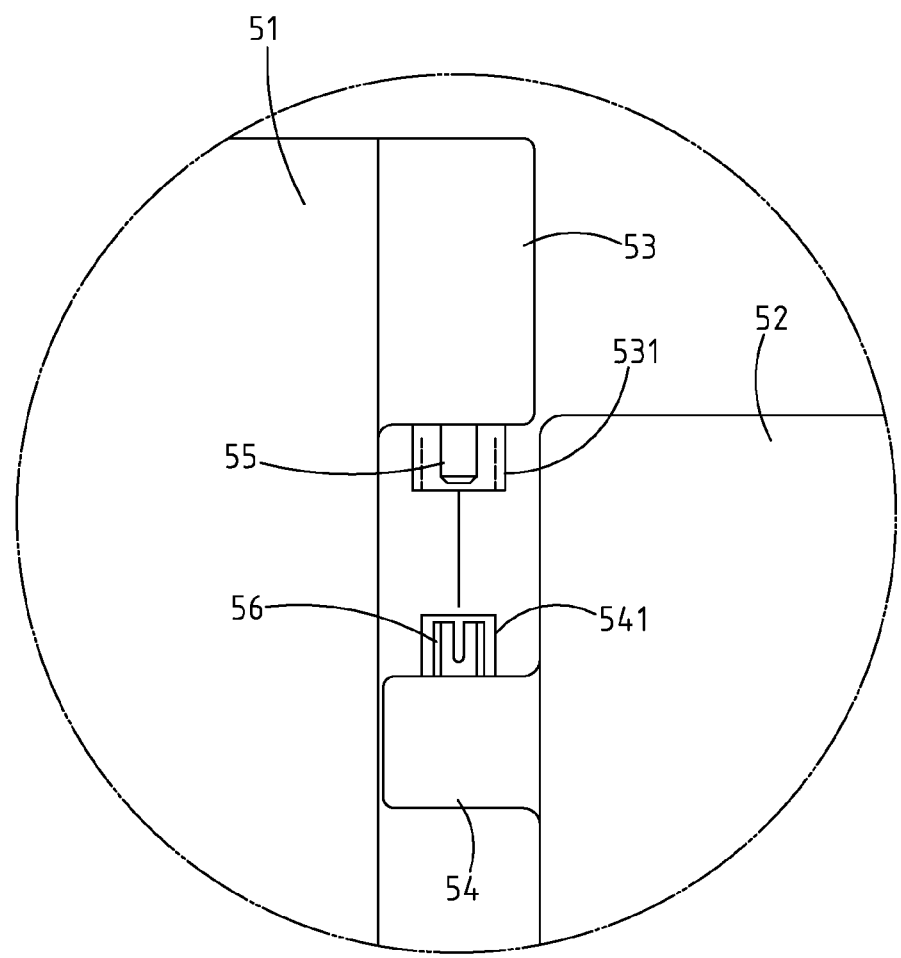
FIG. 4 shows a partial isolated elevation view of the connecting ports.
Figure 5:
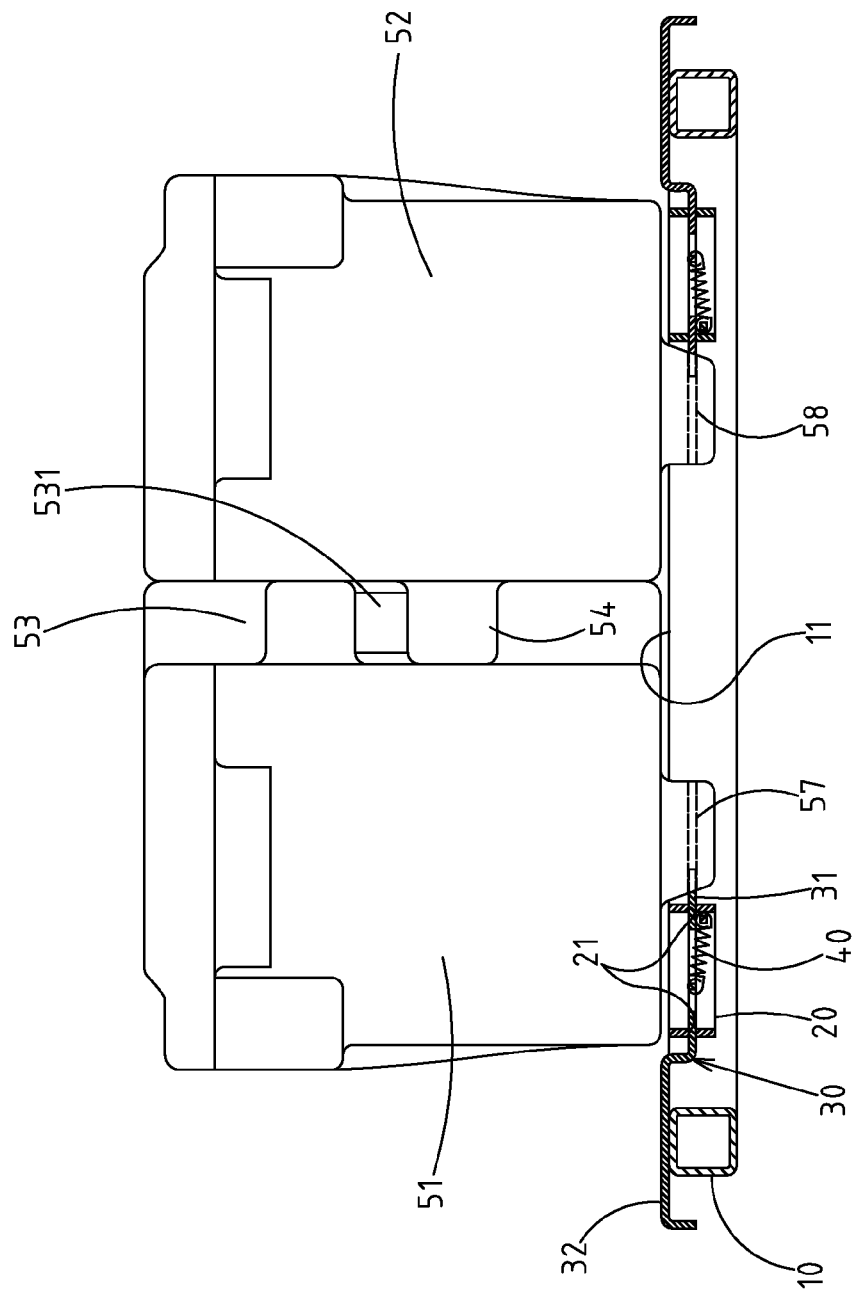
FIG. 5 shows an elevation view of the two cases installed on the frame of the electric vehicle.
Figure 6:
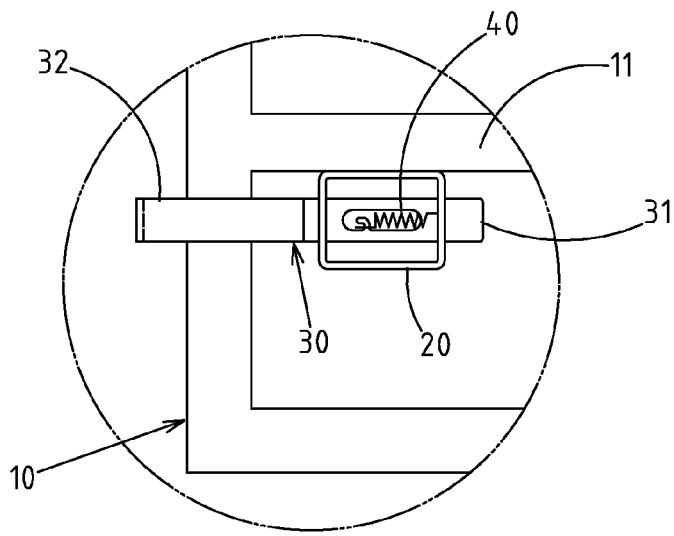
FIG. 6 shows a partial magnified elevation view of the positioning components for the battery containers.

The features and the advantages of the present invention will be more readily understood upon a thoughtful deliberation of the following detailed description of a preferred embodiment of the present invention with reference to the accompanying drawings.

As shown in FIGS. 1–5, there is an improved battery container for an electric vehicle embodied in the present invention.

The present invention includes the electric vehicle body 10.

There is also a battery container supporting stand 11, which is installed at the preset site of the electric vehicle body 10 and forms a shape of a supporting surface.

There is a positioning structure, which is assembled on the left and right sides of the battery container supporting stand 11 of the battery container. Each assembly of the positioning structure includes: a fixed base 20, which provides a guiding runner 21; a positioning board 30, whose interior is pivoted to go through the center of the above guiding runner 21 and then forms an insertion assembly 31, while an exterior stretches outside the battery container supporting stand 11 and forms a pulling controller 32; a retractable spring 40, which is installed between the positioning board 30 and the fixed base 20, and through which the insertion assembly 31 will be set in an inward projecting state when the positioning board 30 is pulled inward under a normal situation.

There is a battery container set, which is aligned and combined by the first 51 and the second 52 cases. At the combined site of the two cases 51, 52, connecting ports 53 54 are situated, which can be mutually embedded and mounted. And both the connecting ports have positive 55 and negative 56 electric connectors that can be oppositely inserted and jointed, and then the electrodes of the batteries inside the two cases 51, 52 can be connected.

Figure 7:
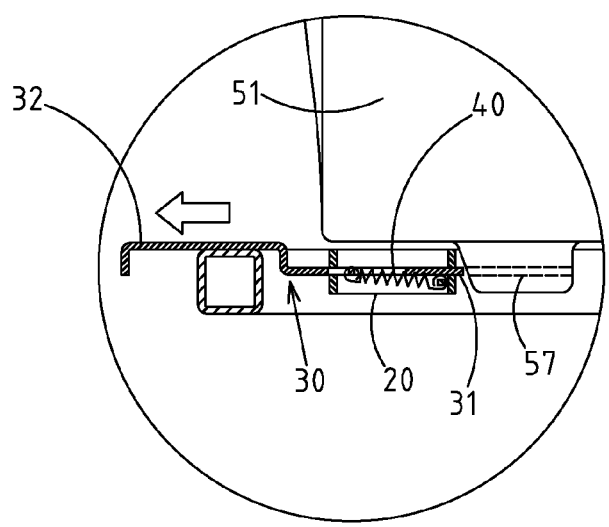
FIG. 7 shows a partial magnified sectional view of the positioning components for the battery containers.

The positioning jacks 57, 58 are set on the bottom sides of the first 51 and second 52 cases. Their locations are opposite of the insertion assembly 31 that is inside the positioning board 30 of the positioning structure. The cases 51, 52 can then be positioned by inserting the insertion assembly 31 into the positioning jacks 57, 58. On the contrary, as shown in FIG. 7, the insertion assembly 31 can be retreated from the positioning jacks 57, 58 when the positioning board 30 is pulled outward, and then the battery containers are released, that is, the two cases 51, 52 can then be detached from the battery container supporting stand 11.

Therein, the connecting ports 53 54 of the two cases 51 52 are of the shapes of bulgy blocks that face each other in an up-and-down manner, and the facing surface is designed with positive and a negative projecting tubes 531 541, which can be inserted into and jointed with each other. This can ensure that the positive and negative electric connectors 55 56 are inserted into the positive and negative projecting tubes 531 541, respectively.

Through the above structure and combination, the battery container described in this invention is of a combined type. The way of assembling the container is as follows. To begin with, join the two cases 51 52 together through mutually embedding and mounting the connecting ports 53 54. At the same time, join the positive and negative electric connectors 55 56, such that the electrodes of the batteries inside the two cases 51 52 can be connected and the cases 51 52 after alignment and combination can be placed together on the battery container supporting stand 11 of the vehicle body 10. The assembles of the positioning structure are used to control the positioning of and the detachment between the battery container supporting stand 11 and the cases 51 52.

I claim:

1. An apparatus comprising:
   an electric vehicle body;
   a battery container support stand affixed to said vehicle body, said support stand defining a supporting surface, said support stand having a left side and a right side;
   a positioning structure assembled onto each of said left side and said right side of support stand, said positioning structure comprising:
      a fixed base extending downwardly from said support stand, said fixed base defining a guiding runner;
      a positioning member extending through said guiding runner so as to define an insertion portion at an end extending beyond said guiding runner, said positioning member having an opposite end extending outwardly beyond the side of said support stand, said opposite end defining a pulling controller; and
      a spring connected between said fixed base and said positioning member, said insertion member extending through said spring, said spring urging said insertion member in a direction beyond said guiding runner and urging said pulling controller toward said support stand; and
   a battery container set having a first case and a second case, each of said first and second cases having a connecting port, the connecting port of one of said first and second cases mounted and embedded into the connecting port of the other of said first and second cases, the connecting ports having positive and negative electrical connections, each of said first and second cases having a battery therein, the batteries having electrodes respectively at said positive and negative electrical connectors, each of said first and second cases having a positioning jack at a bottom thereof, the positioning jack aligned with the insertion portion of said positioning member, said spring urging the insertion member into the positioning jack, said positioning member being pullable outwardly against the urge of said spring such that said insertion member can separate from said positioning jack so as to allow the battery container set to be released from said support stand.

2. The apparatus of claim 1, each of said first and second cases having a bulgy block extending outwardly from a side thereof, the bulgy block having the connecting port therein, the bulgy block of one of said first and second cases facing the bulgy block of the other of said first and second cases in an up-and-down manner, a facing surface of one of the bulgy blocks having a male connector thereon, a facing surface of the other of the bulgy blocks having a female connector thereon so as to receive the male connector therein.

* * * * *